United States Patent
Wu et al.

(10) Patent No.: US 12,028,900 B2
(45) Date of Patent: Jul. 2, 2024

(54) WIRELESS COMMUNICATION SYSTEM, METHOD AND RELATED TRANSMITTING APPARATUS

(71) Applicant: Wistron NeWeb Corporation, Hsinchu (TW)

(72) Inventors: Chia-Hsin Wu, Hsinchu (TW); Chia-Hsiang Wang, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 390 days.

(21) Appl. No.: 17/679,019

(22) Filed: Feb. 23, 2022

(65) Prior Publication Data
US 2022/0377797 A1 Nov. 24, 2022

(30) Foreign Application Priority Data
May 20, 2021 (TW) ................. 110118277

(51) Int. Cl.
*H04W 74/0808* (2024.01)
*H04B 7/06* (2006.01)
*H04W 24/10* (2009.01)
*H04W 72/0453* (2023.01)
*H04W 74/00* (2009.01)

(52) U.S. Cl.
CPC ...... *H04W 74/0825* (2013.01); *H04B 7/0626* (2013.01); *H04W 24/10* (2013.01); *H04W 72/0453* (2013.01); *H04W 74/002* (2013.01)

(58) Field of Classification Search
CPC ............ H04W 74/0825; H04W 24/10; H04W 72/0453; H04W 74/002; H04W 48/16; H04W 84/12; H04B 7/0626
See application file for complete search history.

(56) References Cited

U.S. PATENT DOCUMENTS

| | | | |
|---|---|---|---|
| 11,140,738 B1* | 10/2021 | Rane | H04W 76/14 |
| 2016/0156673 A1* | 6/2016 | Emmanuel | H04W 4/38 370/338 |
| 2018/0034707 A1* | 2/2018 | Aoki | H04W 48/20 |
| 2018/0035357 A1* | 2/2018 | Chi | H04W 74/006 |
| 2021/0405940 A1* | 12/2021 | Tsuchiya | G06F 3/1292 |

FOREIGN PATENT DOCUMENTS

| | | |
|---|---|---|
| WO | 2017/070099 A1 | 4/2017 |
| WO | 2020/072141 A1 | 4/2020 |

* cited by examiner

*Primary Examiner* — Jae Y Lee
(74) *Attorney, Agent, or Firm* — Winston Hsu

(57) ABSTRACT

A wireless communication system includes a receiving apparatus and a transmitting apparatus. The transmitting apparatus includes a transmitting processing unit, configured to determine a wireless transmission channel on a first frequency band when in a first mode; a transmitting antenna unit, configured to transmit information of the wireless transmission channel and a channel state information of the wireless transmission channel on a second frequency band when in the first mode of the transmitting apparatus; and a wireless sensing unit, configured to perform a wireless sensing on the wireless transmission channel when in a second mode of the transmitting apparatus.

17 Claims, 3 Drawing Sheets

WIRELESS COMMUNICATION SYSTEM, METHOD AND RELATED TRANSMITTING APPARATUS

BACKGROUND OF THE INVENTION

1. Field of the Invention

The present invention relates to a wireless communication system and method, and a related transmitting apparatus, and more particularly, to a wireless communication system and method, and a related transmitting apparatus capable of preventing co-channel interference.

2. Description of the Prior Art

A conventional auto channel selection (ACS) function performed by an access point (AP) of a wireless communication system usually scans neighboring wireless channels and then selects a cleanest wireless channel for transmission. Under a Wi-Fi network architecture, however, the auto channel selection function is not supported when the AP or related wireless sensing products are in an Ad Hoc or station mode (STA mode), resulting in co-channel interference being generated. Therefore, improvements are necessary to the conventional techniques.

SUMMARY OF THE INVENTION

In light of this, the present invention provides a wireless communication system, method and related transmitting apparatus for preventing co-channel interference.

An embodiment of the present invention discloses a wireless communication system comprising a receiving apparatus and a transmitting apparatus. The transmitting apparatus comprises a transmitting processing unit, which is configured to determine a wireless transmission channel on a first frequency band when in a first mode; a transmitting antenna unit, configured to transmit information of the wireless transmission channel and a channel state information of the wireless transmission channel on a second frequency band when in the first mode of the transmitting apparatus; and a wireless sensing unit, configured to perform wireless sensing on the wireless transmission channel when in a second mode of the transmitting apparatus.

Another embodiment of the present invention discloses a wireless communication method for a transmitting apparatus of a wireless communication system. The transmitting apparatus comprises a transmitting processing unit, a transmitting antenna unit and a wireless sensing unit. The wireless communication method comprises: determining, by the transmitting processing unit, a wireless transmission channel on a first frequency band when in a first mode; transmitting, by the transmitting antenna unit, information of the wireless transmission channel and a channel state information of the wireless transmission channel on a second frequency band when in the first mode of the transmitting apparatus; and performing, by the wireless sensing unit, a wireless sensing on the wireless transmission channel when in a second mode of the transmitting apparatus.

Another embodiment of the present invention discloses a transmitting apparatus for a wireless communication system, comprising: a transmitting processing unit, configured to determine a wireless transmission channel on a first frequency band when in a first mode; a transmitting antenna unit, configured to transmit information of the wireless transmission channel and a channel state information of the wireless transmission channel on a second frequency band when in the first mode of the transmitting apparatus; and a wireless sensing unit, configured to perform a wireless sensing on the wireless transmission channel when in a second mode of the transmitting apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
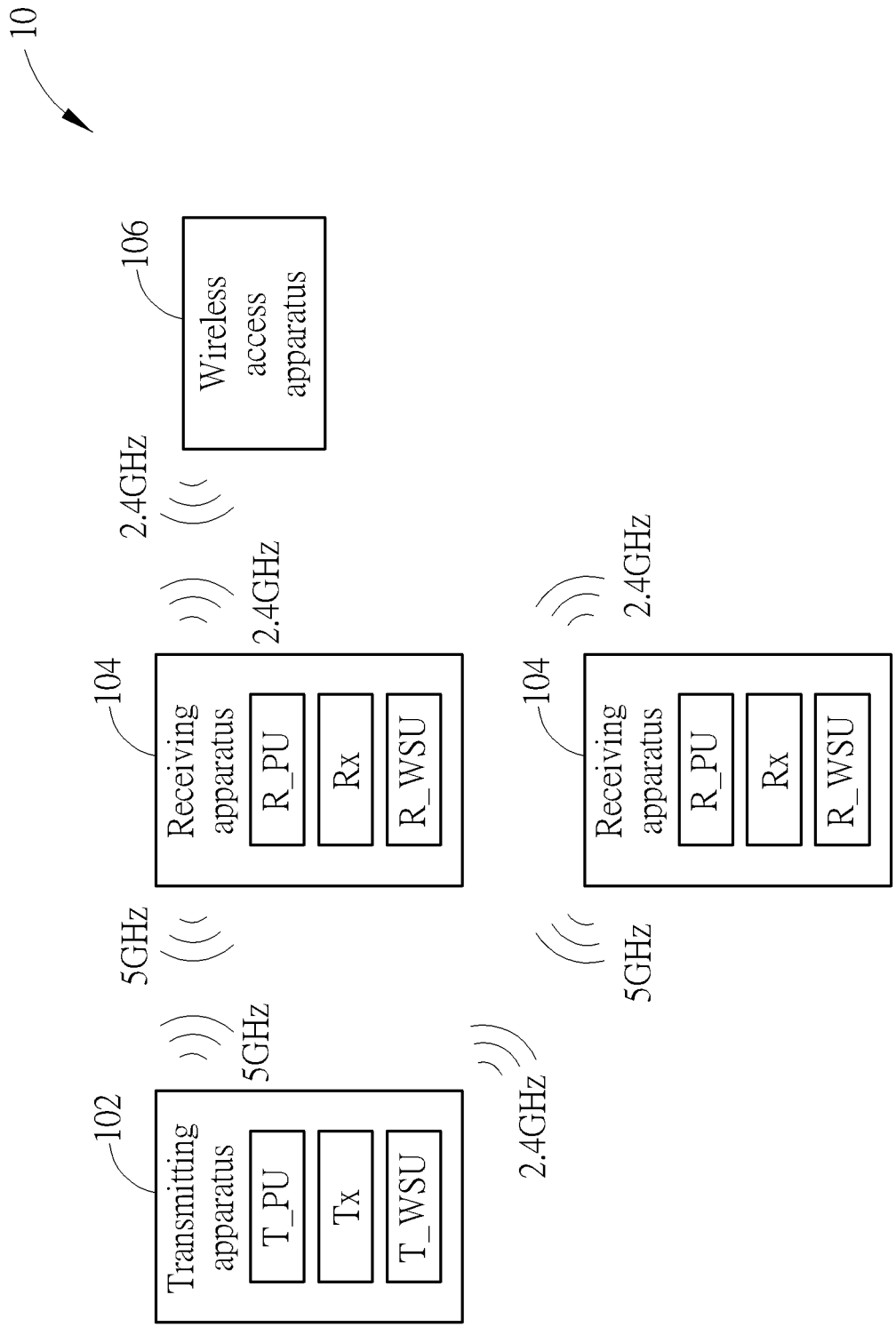
FIG. 1 is a schematic diagram of a wireless communication system according to an embodiment of the present invention.
Figure 2:
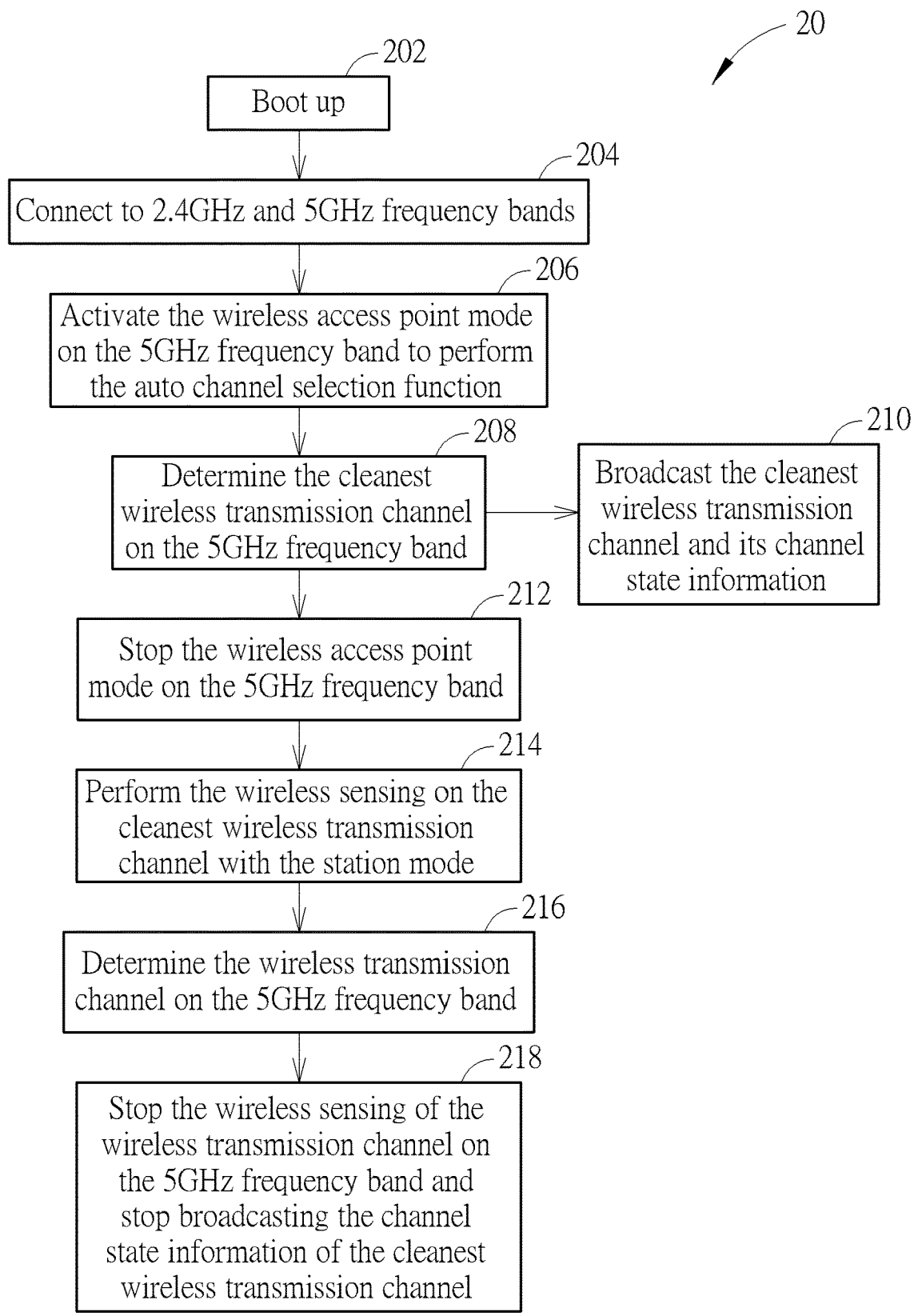
FIGS. 2 and 3 are schematic diagrams of a wireless communication method according to an embodiment of the present invention.
Figure 3:
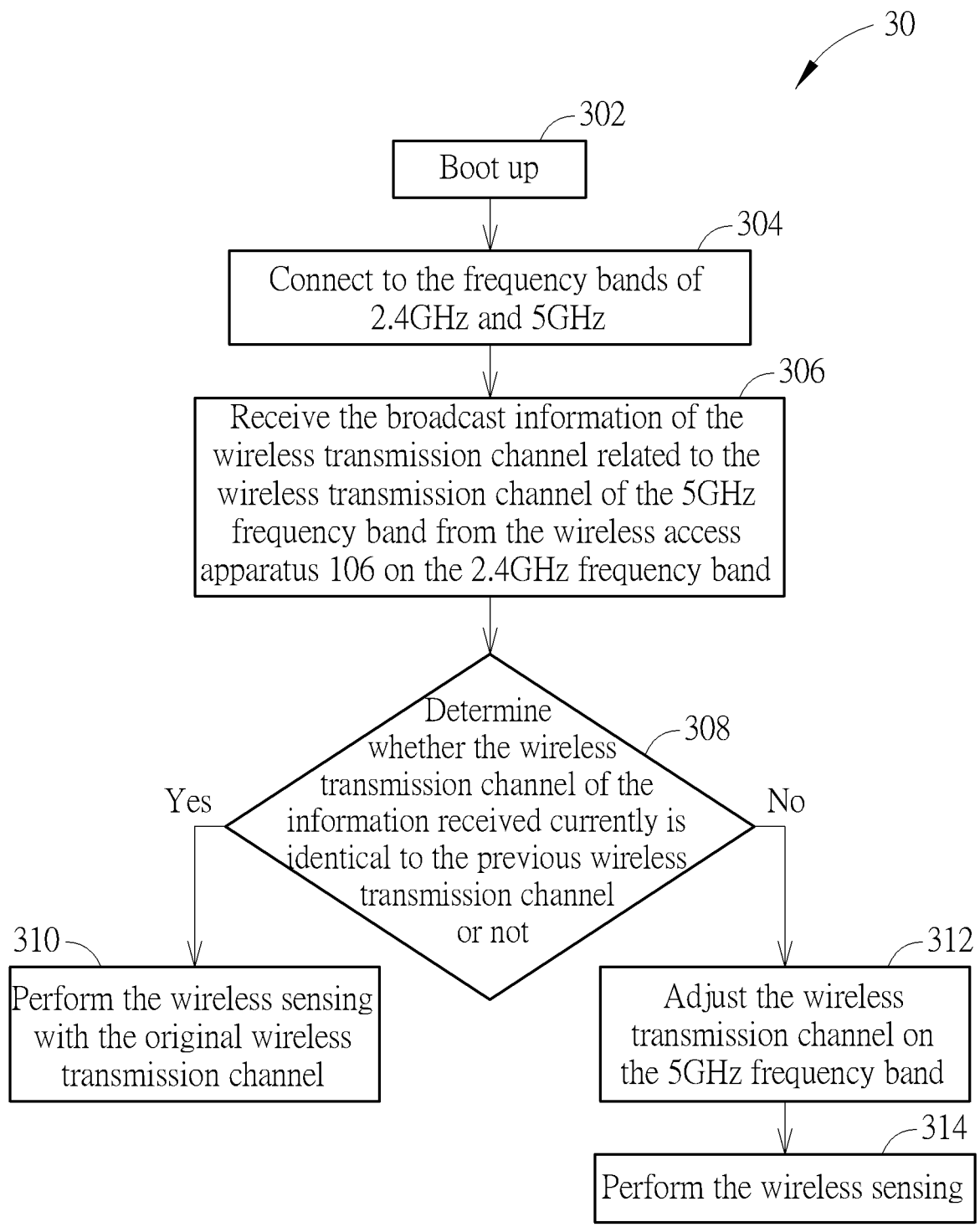

Refer to FIG. 1, which is a schematic diagram of a wireless communication system 10 according to an embodiment of the present invention. The wireless communication system 10 includes a transmitting apparatus 102, a receiving apparatus 104 and a wireless access apparatus 106, and is for a wireless network standard such as a Wi-Fi network. In some embodiments, the wireless communication system 10 may be utilized for wireless sensing. The transmitting apparatus 102 is configured to transmit wireless signals, and may be implemented by a wireless access point (AP) or a signal transmitter of a Wi-Fi base station. The transmitting apparatus 102 may include a transmitting processing unit T_PU, a transmitting antenna unit Tx and a wireless sensing unit WSU. The transmitting processing unit T_PU is configured to determine a wireless transmission channel on a first frequency band when in a first mode. The transmitting antenna unit Tx may include one or more transmitting antennas for transmitting information of the wireless transmission channel and a channel state information of the wireless transmission channel on a second frequency band when in the first mode of the transmitting apparatus 102. The wireless sensing unit WSU is configured to perform wireless sensing on the wireless transmission channel when in a second mode of the transmitting apparatus 102. The receiving apparatus 104 may be a signal receiver of a Wi-Fi base station, for receiving wireless signals from the transmitting apparatus 102 and the wireless access apparatus 106, wherein the receiving apparatus 104 may include a receiving processing unit R_PU, a receiving antenna unit Rx and a wireless sensing unit WSU. The receiving antenna unit Rx may include one or more antennas for receiving wireless signals from the transmitting apparatus 102 or the wireless access apparatus 106. The receiving processing unit R_PU is configured to process the received wireless signals. The wireless access apparatus 106 may be a wireless base station, for receiving data from the transmitting apparatus 102 on the second frequency band, wherein the data includes a command for requesting the receiving apparatus 104 to perform the wireless sensing on the determined wireless transmission channel, and then transmitting the data to the receiving apparatus 104. As such, the receiving apparatus 104 may switch the wireless transmission channel to perform the wireless sensing. The transmitting apparatus 102 may perform an auto channel selection function in the first mode to scan the wireless transmission channels neighboring the transmitting apparatus 102 to determine the wireless transmission channel, such that the receiving apparatus 104 determines whether to adjust the wireless transmission channel or not according to the channel information on the second frequency band broadcast by the transmitting apparatus 102. In this way, the wireless communication system 10 according to an embodiment of the present invention may prevent co-channel interference when the transmitting apparatus 102 and the receiving apparatus 104 are performing the wireless sensing.

In detail, when the transmitter of the conventional wireless access point is in an Ad Hoc mode or a station mode, the auto channel selection function is not supported, which results in co-channel interference. When the transmitting apparatus 102 according to an embodiment of the present invention is booted up, it will be connected to the first frequency band (e.g. a frequency band of 5 GHz) and the second frequency band (e.g. a frequency band of 2.4 GHz), and the auto channel selection function of a wireless access point mode (i.e. the first mode) is activated by the transmitting processing unit T_PU to scan neighboring wireless transmission channels. A cleanest wireless transmission channel is selected (i.e. a wireless transmission channel free from co-channel interference), wherein the transmitting processing unit T_PU of the transmitting apparatus 102 may select the cleanest wireless transmission channel according to a signal quality, e.g. signal-to-noise ratio (SNR), of the wireless transmission channel. The transmitting antenna unit Tx of the transmitting apparatus 102 may be in a station mode (i.e. the second mode) to transmit the channel state information of the cleanest wireless transmission channel and related command(s) on the second frequency band to the wireless access apparatus 106. The wireless access apparatus 106 is configured to forward the information and the command to the receiving apparatus 104, such that the receiving apparatus 104 may perform the wireless sensing on the wireless transmission channel determined by the transmitting apparatus 102.

An operation method of the transmitting apparatus 102 of the wireless communication system 10 according to an embodiment of the present invention may be summarized by a wireless communication method 20. In an embodiment, the first frequency band is the 5 GHz frequency band, the second frequency band is the 2.4 GHz frequency band, and the wireless communication method 20 includes the following steps:

Step 202: Boot up.
Step 204: Connect to 2.4 GHz and 5 GHz frequency bands.
Step 206: Activate the wireless access point mode on the 5 GHz frequency band to perform the auto channel selection function.
Step 208: Determine the cleanest wireless transmission channel on the 5 GHz frequency band.
Step 210: Broadcast the cleanest wireless transmission channel and its channel state information.
Step 212: Stop the wireless access point mode on the 5 GHz frequency band.
Step 214: Perform the wireless sensing on the cleanest wireless transmission channel with the station mode.
Step 216: Determine the wireless transmission channel on the 5 GHz frequency band.
Step 218: Stop the wireless sensing of the wireless transmission channel on the 5 GHz frequency band and stop broadcasting the channel state information of the cleanest wireless transmission channel.

According to the wireless communication method 20, after the transmitting apparatus 102 is connected to the 2.4 GHz and 5 GHz frequency bands in step 204, the transmitting processing unit T_PU is configured to activate the wireless access point mode on the 5 GHz frequency band in step 206 to perform the auto channel selection function for scanning the neighboring wireless transmission channels. The cleanest wireless transmission channel is determined in step 208. Further, in step 210, the transmitting antenna unit Tx of the transmitting apparatus 102 broadcasts the wireless transmission channel information of the 5 GHz frequency band on the 2.4 GHz frequency band. As such, the receiving apparatus 104 may adjust the wireless transmission channel for the wireless sensing according to the received information of the wireless transmission channel on the 5 GHz frequency band.

After the transmitting processing unit T_PU of the transmitting apparatus 102 determines the wireless transmission channel for the wireless sensing, the transmitting apparatus 102 terminates the wireless access point mode on the 5 GHz frequency band in step 212. The transmitting apparatus 102 then performs the wireless sensing on the cleanest wireless transmission channel in the station mode (i.e. the second mode) in step 214. In step 216, the transmitting apparatus 102 may periodically determine the wireless transmission channel for the wireless sensing on the 5 GHz frequency band with the auto channel selection function. For example, the transmitting apparatus 102 may periodically check the wireless transmission channel on the 5 GHz frequency band for one to few hours after booting up to make sure that the selected wireless transmission channel is the cleanest channel.

In step 218, when the transmitting processing unit T_PU of the transmitting apparatus 102 acknowledges that the wireless transmission channel on the 5 GHz frequency band is required to be reselected with the auto channel selection function, i.e. the signal quality of the current wireless transmission channel is not qualified, the wireless sensing on the wireless transmission channel of the 5 GHz frequency band is terminated, and the transmitting antenna unit Tx of the transmitting apparatus 102 stops broadcasting the channel state information of the cleanest wireless transmission channel for wireless sensing. Then, the wireless communication method 20 goes to step 206 for re-activating the wireless access point mode on the 5 GHz frequency band to perform the auto channel selection function. According to different embodiments, steps 216-218 may be omitted.

An operation method of the receiving apparatus 104 of the wireless communication system 10 according to an embodiment of the present invention is summarized by a wireless communication method 30. In an embodiment, the first frequency band is the 5 GHz frequency band, the second frequency band is the 2.4 GHz frequency band, and the wireless communication method 30 includes the following steps:

Step 302: Boot up.
Step 304: Connect to the frequency bands of 2.4 GHz and 5 GHz.
Step 306: Receive the broadcast information of the wireless transmission channel related to the wireless transmission channel of the 5 GHz frequency band from the wireless access apparatus 106 on the 2.4 GHz frequency band.
Step 308: Determine whether the wireless transmission channel of the information received currently is identical to the previous wireless transmission channel or not. If yes, go to step 310; if not, go to step 312.

Step 310: Perform the wireless sensing with the original wireless transmission channel.

Step 312: Adjust the wireless transmission channel on the 5 GHz frequency band.

Step 314: Perform the wireless sensing.

According to the wireless communication method 30, the receiving apparatus 104 connects to the 2.4 GHz and 5 GHz frequency bands in step 304. In step 306, the receiving antenna unit Rx receives the broadcast information related to the wireless transmission channel of the 5 GHz frequency band from the wireless access apparatus 106 on the 2.4 GHz frequency band, which includes the command of the determined wireless transmission channel from the transmitting apparatus 102. In an embodiment, the receiving apparatus 104 may obtain the information related to the wireless transmission channel after a pause period (e.g. 3 seconds), i.e. the information related to the wireless transmission channel transmitted by the wireless access apparatus 106.

Then, in step 308, the receiving processing unit R_PU of the receiving apparatus 104 may determine whether the information of the wireless transmission channel related to the 5 GHz frequency band is identical to the previous wireless transmission channel or not. In an embodiment, when the receiving apparatus 104 is booted up and the wireless sensing is not started yet, the wireless communication method 30 goes to step 312. In another embodiment, when the receiving apparatus 104 is performing the wireless sensing, the receiving processing unit R_PU of the receiving apparatus 104 determines whether the wireless transmission channel of the information received currently is identical to the previous wireless transmission channel or not. When the wireless transmission channel of the information received currently is identical to the previous wireless transmission channel, the wireless transmission channel determined by the transmitting apparatus 102 remains the same, and the wireless sensing unit WSU of the receiving apparatus 104 continues to perform the wireless sensing on the original wireless transmission channel (i.e. step 310); when the wireless transmission channel of the information received currently is different from the previous wireless transmission channel, the wireless transmission channel determined by the transmitting apparatus 102 is varied, and thus the wireless transmission channel on the 5 GHz frequency band is adjusted in step 312.

Since the broadcast information of the wireless transmission channel on the 5 GHz frequency band transmitted by the transmitting apparatus 102 carries the channel state information of the cleanest wireless transmission channel for the wireless sensing, the receiving processing unit R_PU of the receiving apparatus 104 may adjust the wireless transmission channel accordingly in step 312, such that the wireless sensing unit WSU of the receiving apparatus 104 performs the wireless sensing in step 314.

In addition, in the above wireless transmission configurations, the transmission of the channel state information of the wireless transmission channel between the transmitting apparatus 102 and the receiving apparatus 104 may be seen as a transmission between client terminals in the wireless network. In this way, the wireless communication system 10 according to an embodiment of the present invention may prevent co-channel interference when the transmitting apparatus does not support the auto channel selection function in the Ad Hoc mode or the station mode.

It should be noted that, although the above embodiments are provided to illustrate the concept of the present invention, those skilled in the art may make modifications to the present invention based on different requirements, which are not limited thereto. For example, the first frequency band and the second frequency band are not limited to 5 GHz and 2.4 GHz as illustrated in the above embodiments. In addition, the transmitting apparatus for the wireless communication method may be implemented by a dedicated apparatus to determine the channel state information of the wireless transmission channel. These modifications are not limited thereto, and also belong to the scope of the present invention.

In summary, the present invention provides a wireless communication system, method and related transmitting apparatus which can prevent co-channel interference of the wireless communication system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication system, comprising:
a receiving apparatus; and
a transmitting apparatus, comprising:
   a transmitting processing unit, configured to determine a wireless transmission channel on a first frequency band when in a first mode;
   a transmitting antenna unit, configured to transmit information of the wireless transmission channel and a channel state information of the wireless transmission channel on a second frequency band when in the first mode of the transmitting apparatus; and
   a wireless sensing unit, configured to perform a wireless sensing on the wireless transmission channel when in a second mode of the transmitting apparatus.

2. The wireless communication system of claim 1, wherein the wireless sensing unit of the transmitting apparatus performs an auto channel selection function in the first mode to scan wireless transmission channels neighboring the transmitting apparatus and to determine the wireless transmission channel.

3. The wireless communication system of claim 1, wherein the wireless transmission channel is free from co-channel interference.

4. The wireless communication system of claim 1, wherein the first mode is terminated after the transmitting processing unit of the transmitting apparatus determines the wireless transmission channel, and then the wireless sensing is performed in the second mode.

5. The wireless communication system of claim 1, wherein the transmitting apparatus is operated as a wireless access point when in the first mode, and the transmitting apparatus is operated as a wireless station when in the second mode.

6. The wireless communication system of claim 1, further comprising:
a wireless access apparatus, configured to receive data from the transmitting apparatus on the second frequency band and transmit the data to the receiving apparatus.

7. The wireless communication system of claim 6, wherein the receiving apparatus comprises:
a wireless sensing unit, configured to perform the wireless sensing;
a receiving antenna unit, configured to receive the data from the wireless access apparatus and a command related to the wireless transmission channel on the second frequency band; and a receiving processing unit, configured to determine whether a wireless transmission channel of the command received currently is identical to a previous wireless transmission channel or not, and to adjust the wireless transmission channel of the receiving apparatus for the wireless sensing when the wireless transmission channel of the command received currently is different from the previous wireless transmission channel.

8. A wireless communication method for a transmitting apparatus of a wireless communication system, wherein the transmitting apparatus comprises a transmitting processing unit, a transmitting antenna unit and a wireless sensing unit, and the wireless communication method comprises:
   determining, by the transmitting processing unit, a wireless transmission channel on a first frequency band when in a first mode;
   transmitting, by the transmitting antenna unit, information of the wireless transmission channel and a channel state information of the wireless transmission channel on a second frequency band when in the first mode of the transmitting apparatus; and
   performing, by the wireless sensing unit, a wireless sensing on the wireless transmission channel when in a second mode of the transmitting apparatus.

9. The wireless communication method of claim 8, wherein the wireless sensing unit of the transmitting apparatus performs an auto channel selection function in the first mode to scan wireless transmission channels neighboring the transmitting apparatus and to determine the wireless transmission channel.

10. The wireless communication method of claim 8, wherein the wireless transmission channel is free from co-channel interference.

11. The wireless communication method of claim 8, wherein the first mode is terminated after the transmitting processing unit of the transmitting apparatus determines the wireless transmission channel, and then the wireless sensing is performed in the second mode.

12. The wireless communication method of claim 8, wherein the transmitting apparatus is operated as a wireless access point when in the first mode, and the transmitting apparatus is operated as a wireless station when in the second mode.

13. A transmitting apparatus for a wireless communication system, comprising:
   a transmitting processing unit, configured to determine a wireless transmission channel on a first frequency band when in a first mode;
   a transmitting antenna unit, configured to transmit information of the wireless transmission channel and a channel state information of the wireless transmission channel on a second frequency band when in the first mode of the transmitting apparatus; and
   a wireless sensing unit, configured to perform a wireless sensing on the wireless transmission channel when in a second mode of the transmitting apparatus.

14. The transmitting apparatus of claim 13, wherein the wireless sensing unit of the transmitting apparatus performs an auto channel selection function in the first mode to scan wireless transmission channels neighboring the transmitting apparatus and to determine the wireless transmission channel.

15. The transmitting apparatus of claim 13, wherein the wireless transmission channel is free from co-channel interference.

16. The transmitting apparatus of claim 13, wherein the first mode is terminated after the transmitting processing unit of the transmitting apparatus determines the wireless transmission channel, and then the wireless sensing is performed in the second mode.

17. The transmitting apparatus of claim 13, wherein the transmitting apparatus is operated as a wireless access point when in the first mode, and the transmitting apparatus is operated as a wireless station when in the second mode.

* * * * *